(12) United States Patent
Petit et al.

(10) Patent No.: US 12,047,249 B2
(45) Date of Patent: Jul. 23, 2024

(54) CENTRALIZED MANAGEMENT OF DATA FLOW MAPS FOR DISTRIBUTED EDGE NODE DEPLOYMENT

(71) Applicant: Siemens Aktiengesellschaft, Munich (DE)

(72) Inventors: Emmanuel Petit, Chevreuse (FR); Abdul Basit, Haroon Abad. (PK); Ghada Bahig, Cairo (EG); Ahmed Moustafa, Giza (EG)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 18/042,837

(22) PCT Filed: Aug. 27, 2020

(86) PCT No.: PCT/US2020/048140
§ 371 (c)(1),
(2) Date: Feb. 24, 2023

(87) PCT Pub. No.: WO2022/046054
PCT Pub. Date: Mar. 3, 2022

(65) Prior Publication Data
US 2023/0327957 A1   Oct. 12, 2023

(51) Int. Cl.
*H04L 41/14* (2022.01)
*G16Y 40/35* (2020.01)

(52) U.S. Cl.
CPC ............ *H04L 41/145* (2013.01); *G16Y 40/35* (2020.01)

(58) Field of Classification Search
CPC .............................. H04L 41/145; G16Y 40/35
See application file for complete search history.

(56) References Cited

U.S. PATENT DOCUMENTS

| 11,563,810 B2 * | 1/2023 | Yamato | G08C 15/00 |
| 11,573,672 B2 * | 2/2023 | Nixon | G06F 3/04817 |
| 11,663,232 B2 * | 5/2023 | Yamato | G06F 16/248 |
| | | | 707/602 |

(Continued)

FOREIGN PATENT DOCUMENTS

| CN | 108353090 A | * | 7/2018 | ............. G05B 15/02 |
| CN | 113589096 A | * | 11/2021 | |

(Continued)

*Primary Examiner* — Shean Tokuta (57) ABSTRACT

A computing system to generate models of managed devices and applications in an Internet of Things (IOT) system by identifying each endpoint in the managed devices and applications capable of transmitting or receiving the data and defining flows for data from the endpoints in sensors to endpoints of IOT servers via endpoints of the programmable edge device applications. The computing system can develop a data flow map to define a connectivity of the programmable edge device applications to the sensors and the servers in the IOT system for exchanging the data from the sensors to the servers in the IOT system via the programmable edge device applications. The computing system can prompt configuration of the managed devices and applications in the IOT system based on the data flow map, which implements the connectivity of the programmable edge device applications to the sensors and to servers in the IOT system.

17 Claims, 8 Drawing Sheets

(56) References Cited

U.S. PATENT DOCUMENTS

| | | | | |
|---|---|---|---|---|
| 11,700,305 | B2 * | 7/2023 | Naito | H04L 67/12 |
| | | | | 702/188 |
| 11,741,839 | B2 * | 8/2023 | Ookuma | G08G 1/005 |
| | | | | 340/993 |
| 11,748,326 | B2 * | 9/2023 | Hisano | H04W 4/70 |
| | | | | 707/746 |
| 11,758,307 | B2 * | 9/2023 | Misumi | H04B 17/19 |
| | | | | 704/226 |
| 2014/0372561 | A1 * | 12/2014 | Hisano | H04L 47/10 |
| | | | | 709/217 |
| 2017/0155703 | A1 * | 6/2017 | Hao | H04W 4/70 |
| 2017/0277521 | A1 * | 9/2017 | Sharma | G06F 8/34 |
| 2018/0338017 | A1 | 11/2018 | Mekuria et al. | |
| 2020/0084113 | A1 * | 3/2020 | Joshi | G06N 20/00 |
| 2020/0099621 | A1 * | 3/2020 | Oda | H04W 4/70 |
| 2020/0112490 | A1 | 4/2020 | Mopur et al. | |
| 2020/0327371 | A1 * | 10/2020 | Sharma | G06N 3/08 |
| 2021/0075858 | A1 * | 3/2021 | Naito | G06Q 50/10 |
| 2021/0240170 | A1 * | 8/2021 | Skubacz | G05B 19/41825 |
| 2022/0014589 | A1 * | 1/2022 | Padiyar | H04L 67/561 |
| 2022/0026882 | A1 * | 1/2022 | Wang | H04L 67/51 |
| 2023/0327957 | A1 * | 10/2023 | Petit | G16Y 40/35 |
| | | | | 709/224 |

FOREIGN PATENT DOCUMENTS

| | | | | | |
|---|---|---|---|---|---|
| EP | | 3570160 | A1 * | 11/2019 | G05B 19/41825 |
| EP | | 3809673 | A1 * | 4/2021 | G06F 11/3034 |
| JP | | 5445722 | B1 * | 3/2014 | G08G 1/0112 |
| JP | | 2019512973 | A * | 5/2019 | |
| KR | | 101523702 | B1 * | 5/2015 | |
| WO | WO-2015182416 | A1 * | 12/2015 | H04Q 9/00 |
| WO | WO-2016020726 | A1 * | 2/2016 | H04L 12/4633 |
| WO | WO-2017094442 | A1 * | 6/2017 | G06F 13/00 |
| WO | WO-2018088039 | A1 * | 5/2018 | G06F 11/22 |
| WO | WO-2018088040 | A1 * | 5/2018 | G06F 16/2379 |
| WO | WO-2019026602 | A1 * | 2/2019 | A61B 5/00 |
| WO | WO-2019058726 | A1 * | 3/2019 | G06Q 50/10 |
| WO | WO-2022046054 | A1 * | 3/2022 | G16Y 40/35 |
| WO | WO-2022128889 | A1 * | 6/2022 | H04L 67/10 |

\* cited by examiner

CENTRALIZED MANAGEMENT OF DATA FLOW MAPS FOR DISTRIBUTED EDGE NODE DEPLOYMENT

TECHNICAL FIELD

This application is generally related to Internet of Things (IOT) technology and, more specifically, to centralized management of data flow maps for distributed edge node deployment.

BACKGROUND

Many industries have implemented Internet of Things (IOT) technology, which can connect machinery, sensors, control systems, or the like, in an industrial environment, to computers for remote monitoring and control. Many of the machines, sensors, and control systems in the industrial environment can have external interfaces to output information corresponding to their operations to a server via an edge node acting as a protocol translator for transmissions between the industrial environment and the server. For example, specially-programmed edge node can receive the information output from the machines, sensors, and control systems in the industrial environment in one transmission protocol, filter or aggregate the data received from the machines, sensors, and control systems in an attempt to reduce the volume of data uploaded to the server for subsequent processing, and transmit the information to the server with a different transmission protocol.

Each data flow from the external interfaces of the machines, sensors, and control systems in the industrial environment to the server through one or more edge nodes typically include custom configurations. For example the machines, sensors, and control systems in the industrial environment can include custom logic to output data at an external interface using a particular protocol, while the edge nodes can be specially-programmed or hard-coded in static flows, for example, performing data compression, data transformation, such as fast Fourier Transform operations, feature extraction, data combination from various sources, such as data convolution. These customized data flows are hardcoded in the industrial environment to enable the transmission of data from the machines, sensors, and control systems to the server. Hardcoding the data flows into the edge nodes, machines, sensors, and control system is time consuming and renders the overall industrial environment inflexible and difficult to scale.

SUMMARY

This application discloses a computing system to generate models of managed devices and applications in an Internet of Things (IOT) system by identifying each endpoint in the managed devices and applications capable of transmitting or receiving the data and defining flows for data from the endpoints in sensors to endpoints of IOT servers via endpoints of the programmable edge device applications. The computing system can develop a data flow map to define a connectivity of the programmable edge device applications to the sensors and the servers in the IOT system for exchanging the data from the sensors to the servers in the IOT system via the programmable edge device applications. The computing system can prompt configuration of the managed devices and applications in the IOT system based on the data flow map, which implements the connectivity of the programmable edge device applications to the sensors and to servers in the IOT system. Embodiments will be described in greater detail below.

DETAILED DESCRIPTION

Illustrative Operating Environment

Figure 1:
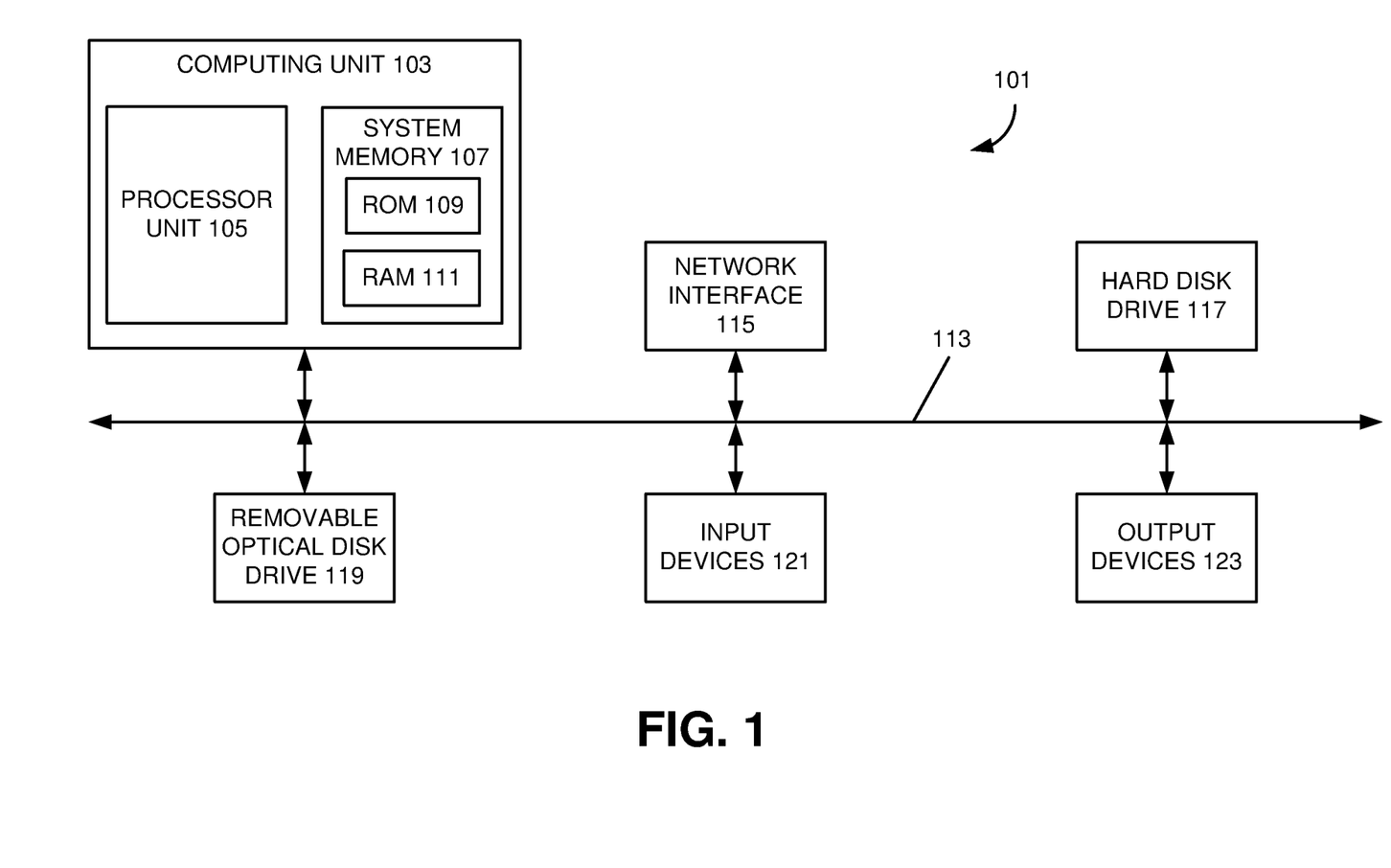
FIGS. 1 and 2 illustrate an example of a computer system of the type that may be used to implement various embodiments.

Various embodiments may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network.

The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
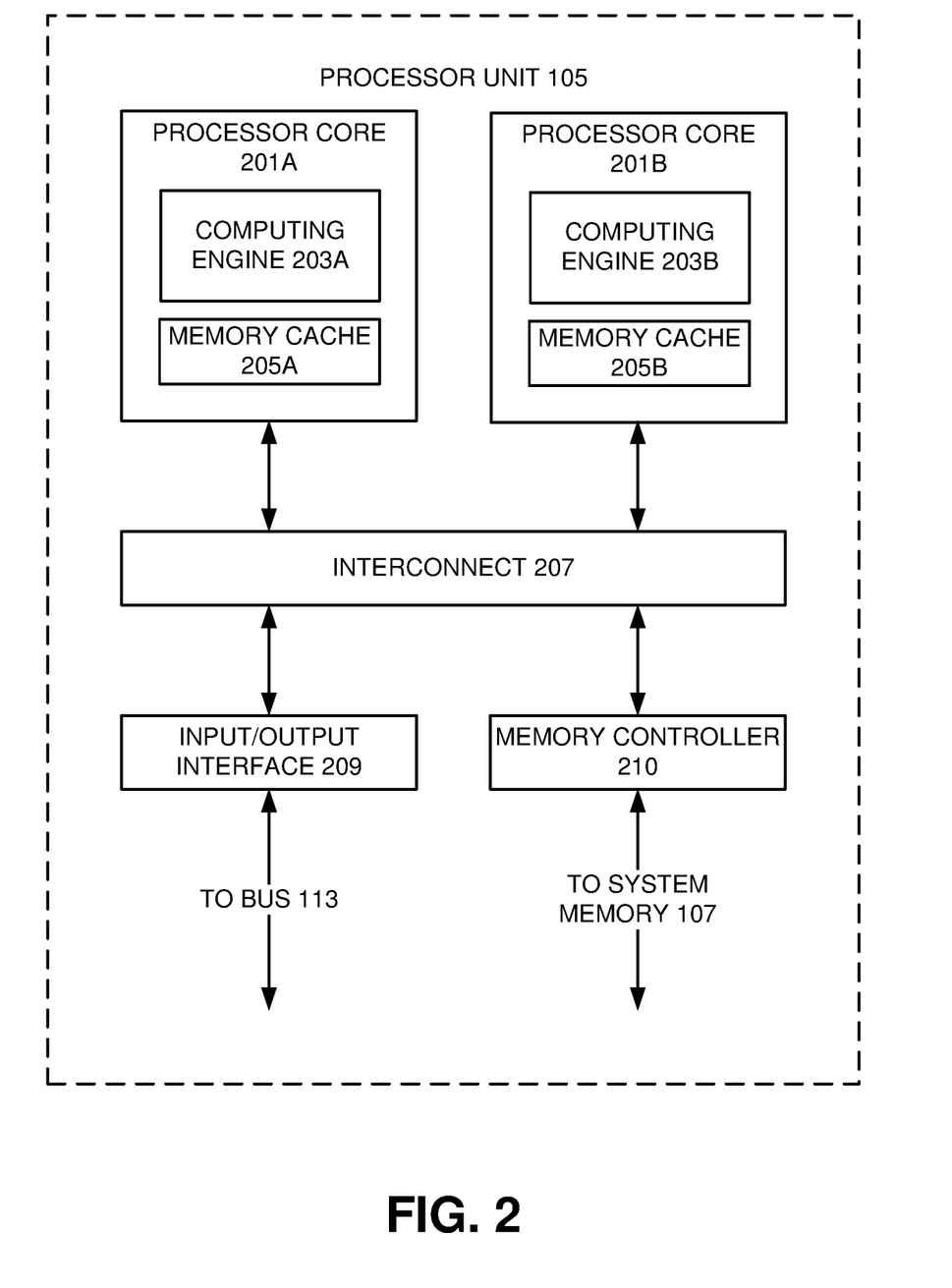

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Internet of Things (JOT) in an Industrial Environment

Figure 3:
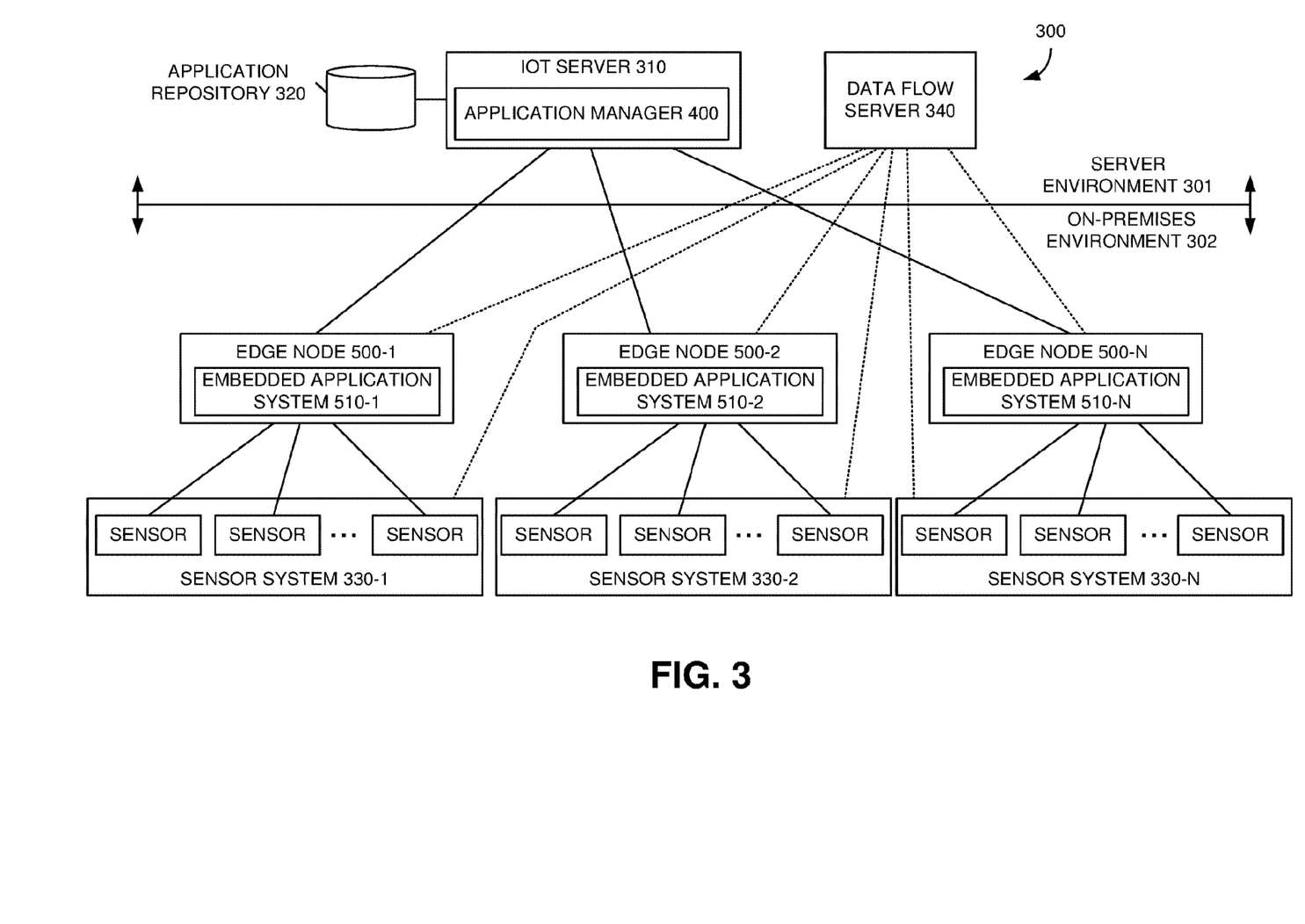
FIG. 3 illustrates an example of an Internet of Things (IOT) system implemented in a server environment and an on-premises environment according to various embodiments.

FIG. 3 illustrates an example of an Internet of Things (IOT) system 300 implemented in a server environment 301 and an on-premises environment 302 according to various embodiments. Referring to FIG. 3, the on-premises environment 302 of the IOT system 300 can include multiple sensor systems 330-1 to 300-N, each including one or more sensors or other devices capable of communicating with one or more IOT edge nodes 500-1 to 500-N. In some embodiments, the sensor system 330-1 can communicate with the IOT edge node 500-1, the sensor system 330-2 can communicate with the IOT edge node 500-2, and the sensor system 330-N can communicate with the IOT edge node 500-N. In other embodiments, one or more of the sensor systems 330-1 to 330-N can communicate with any of the IOT edge nodes 500-1 to 500-N and, as will be described below in greater detail, be configured (and dynamically reconfigured) by a data flow server 340 to communicate with various embedded applications hosted in the IOT edge nodes 500-1 to 500-N.

In a manufacturing environment, such as a factory floor or multiple distributed factories, the sensors in the sensor systems 330-1 to 330-N can gather information corresponding to the manufacturing of a product, for example, by identifying operations or operational states of manufacturing equipment, manufacturing lines, the manufacturing of products, inventory, testing or verification procedures for the products, or the like. The sensors in the sensor systems 330-1 to 330-N can transmit the gathered information towards an IOT server 310 via one or more of the IOT edge nodes 500-1 to 500-N.

The IOT edge nodes 500-1 to 500-N can include embedded application systems 510-1 to 510-N, respectively, to process the information received from the sensor systems 330-1 to 330-N. The embedded application systems 510-1 to 510-N can determine states of the machinery, manufacturing lines, equipment, products, inventory, or the like, based on the information received from the sensor system 330-1 to 330-N. The embedded application systems 510-1 to 510-N can generate messages based on the determined states and transmit the messages to the IOT server 310.

In some embodiments, the embedded application systems 510-1 to 510-N, in the IOT edge nodes 500-1 to 500-N, respectively, can be generic or programmable with regard to the data flow from the sensor system 330-1 to 330-N to the IOT server 310. The data flow server 340 can deploy a configuration, for example, from a data flow map, to the IOT edge nodes 500-1 to 500-N, which can configure the embedded application system 510-1 to 510-N to implement a data flow from the sensor system 330-1 to 330-N to the IOT server 310. The data flow server 340 also can update the configuration of the IOT edge nodes 500-1 to 500-N to implement different data flows from the sensor system 330-1 to 330-N to the IOT server 310, for example, based on a different data flow map. Embodiments will be described below in greater detail.

The IOT edge nodes 500-1 to 500-N can include a processing systems configured to execute instructions corresponding to embedded applications, which can prompt the processing systems to analyze the information received from the sensor systems 330-1 to 330-N, generate the messages, and transmit the messages to the IOT server 310. In some embodiments, the IOT edge nodes 500-1 to 500-N can receive the embedded applications as container images from the IOT server 310 located in the server environment 301. The embedded application systems 510-1 to 510-N can implement Docker engines to execute the container images. The container images can be standalone, executable embedded applications, which can include executable ode, runtime, system tools, system libraries, settings, or the like, utilized by the Docker engines to implement the embedded applications corresponding to the container images.

The IOT server 310 can include an application manager 400 to deploy containers having container images to the IOT edge nodes 500-1 to 500-N. In some embodiments, the application manager 400 can select an embedded application to implement in one of the IOT edge nodes 500-1 to 500-N, for example, from an application repository 320 located in the server environment 301, and generate a container to deploy the selected embedded application to the corresponding IOT edge nodes 500-1 to 500-N. The addition of embedded application systems 510-1 to 510-N to the IOT edge nodes 500-1 to 500-N, respectively, can allow for deployment of the containers and corresponding container images by the application manager 400 to the IOT edge nodes 500-1 to 500-N, which can allow the IOT server 310 to centrally control a flow of information gathered by the sensor systems 330-1 to 330-N to the IOT server 310.

The application manager 400 in the IOT server 310 also can orchestrate various operations performed by the embedded application systems 510-1 to 510-N in the IOT edge nodes 500-1 to 500-N, respectively. For example, the application manager 400 can utilize the embedded application systems 510-1 to 510-N to off-load processing from the server environment 301 to the IOT edge nodes 500-1 to 500-N in the on-premises environment 302. In some embodiments, the application manager 400 in the IOT server 310 can identify processing and/or memory resources in the IOT edge nodes 500-1 to 500-N that remain after implementing container images for the communication of information gathered by the sensor systems 330-1 to 330-N. The application manager 400 can utilize the remaining processing and/or memory resources in the IOT edge nodes 500-1 to 500-N to off-load processing from the server environment 301 to the on-premises environment 302. For example, the application manager 40 can select an embedded application from the application repository 320 corresponding to the operations to be off-loaded to the IOT edge nodes 500-1 to 500-N and deploy a container that includes the embedded application to the corresponding IOT edge nodes 500-1 to 500-N.

In another example, the application manager 400 also can orchestrate the import or export of parameters in the embedded application implemented by the embedded application systems 510-1 to 510-N. The parameters in the embedded application can correspond to values coded in the embedded application or values determined by the embedded application during execution. For example, when the embedded application corresponds to a temperature monitoring application that utilizes a temperature reading from a sensor to determine a rate of temperature change over a preset time period and then generates a message when the rate of temperature change exceeds a threshold value, the parameters can correspond to the rate of temperature change and the threshold value. In this example, the application manager 400 can send a parameter message to one of the IOT edge nodes 500-1 to 500-N implementing the temperature monitoring application, which can include a parameter for the corresponding embedded application systems 510-1 to 510-N to import into the temperature monitoring application, such as a parameter corresponding to a different threshold value. The application manager 400 also can send a parameter message to one of the IOT edge nodes 500-1 to 500-N implementing the temperature monitoring application, which can prompt the corresponding embedded application systems 510-1 to 510-N to export a parameter from the temperature monitoring application, such as a parameter corresponding to a threshold value or the rate of temperature change.

The application manager 400 also can orchestrate the import or export of parameters in the embedded application by implementing an avatar of the embedded application running on the embedded application systems 510-1 to 510-N and then transmitting parameter messaging to the embedded application systems 510-1 to 510-N. In some embodiments, the parameter messaging can prompt the embedded application systems 510-1 to 510-N to import a parameter from the IOT server 310, which can allow the application manager 40 to modify the embedded application implemented by one or more of embedded application systems 510-1 to 510-N without having to deploy a different embedded application to the IOT edge nodes 500-1 to 500-N.

The parameter messaging also can prompt the embedded application systems 510-1 to 510-N to import or export parameters to other devices, such as other IOT edge nodes 500-1 to 500-N. The application manager 400 can orchestrate the sharing of parameters across the distributed IOT edge nodes 500-1 to 500-N with the parameter messaging, which can allow the IOT edge nodes 500-1 to 500-N to operate in conjunction with each other. Embodiments of the application manager and the embedded application system will be described below in greater detail.

Figure 4:
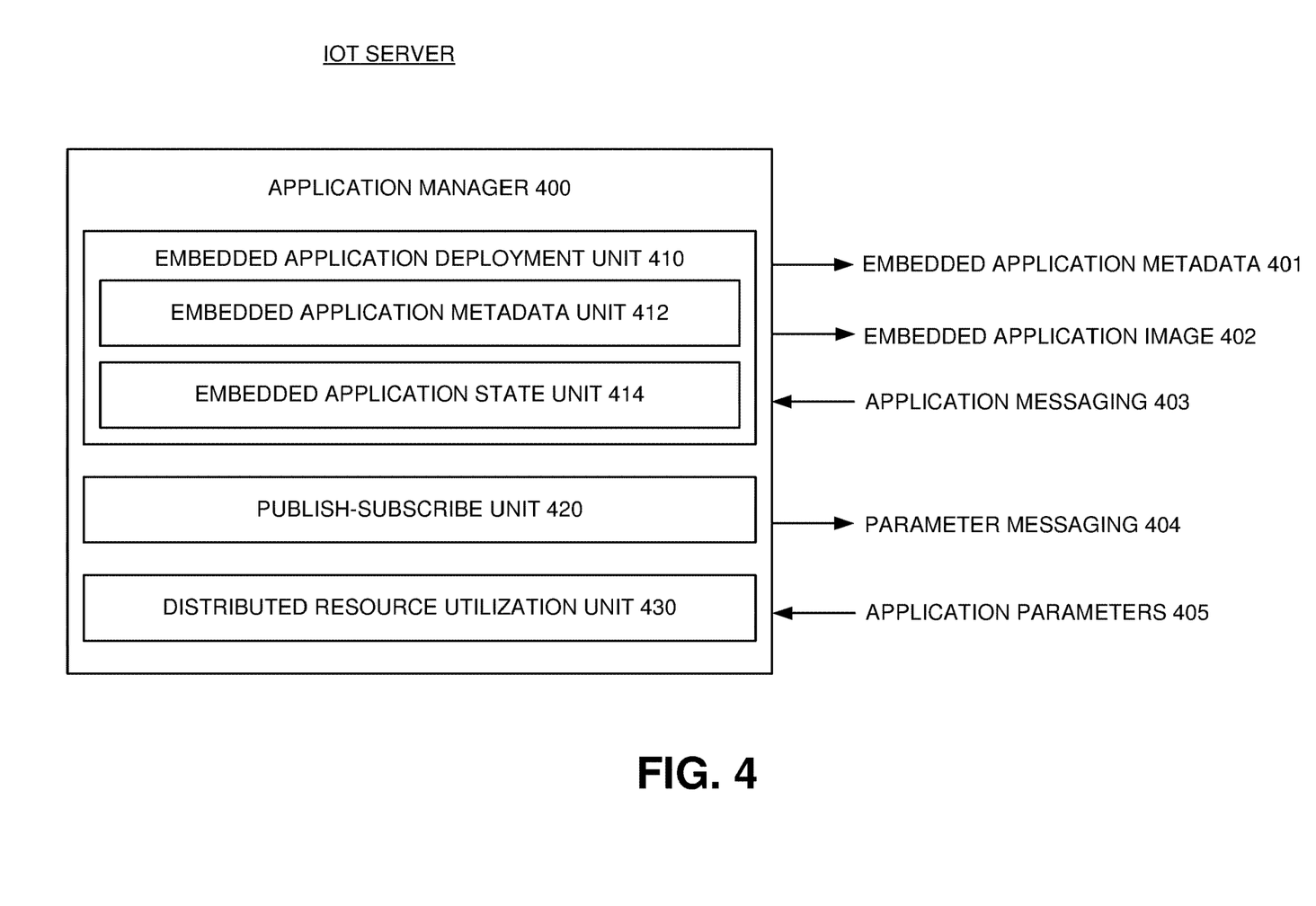
FIG. 4 illustrates an example of an application manager in an IOT server according to various embodiments.

FIG. 4 illustrates an example of an application manager 400 in an IOT server according to various embodiments. Referring to FIG. 4, the IOT server including the application manager 400 can be located in a server environment and be configured to communicate with devices located in an on-premises environment or in a different server environment. The application manager 400 can include an embedded application deployment unit 410 to select embedded applications for deployment on IOT edge nodes in an on-premises environment. In some embodiments, the application manager 400 can select the embedded applications based on input received from a remote user terminal or based on an internal programming. The application manager 400 can retrieve a container image corresponding to the selected embedded application from a memory device, such as an application repository located in the server environment or another memory system storing container images accessible by the IOT server.

The embedded application deployment unit 410 can include a containerized IOT application unit 412 to generate a container 401 that includes the container image corresponding to the selected embedded application. The containerized IOT application unit 412 can transmit the container 401 towards the IOT edge node over a communication network, such as packet-switched network, a circuit-switched network, a combination thereof, or the like. The IOT edge node can extract the container image from the received container 401 and execute the container image, for example, with a Docker engine or the like, to implement the embedded application on the IOT edge node.

The implementation of the embedded application can prompt the IOT edge node to generate application messages 402, which the IOT edge node can transmit to the IOT server over the communication network. The application messages 402 can include information the IOT edge nodes generated, aggregated, filtered, or the like, in response to the execution of the embedded application corresponding to the container image. For example, when the IOT edge node receives industrial measurement data, the application messaging 402 can include a subset of the industrial measurement data, an aggregated report of the industrial measurement data, an indication that the IOT edge node detected an event from industrial measurement data, or the like.

The embedded application deployment unit 410 can include an embedded application state unit 414 to model states of the embedded applications deployed on IOT edge nodes based, at least in part, on the application messages 402 received from the IOT edge nodes. The embedded application state unit 414 can model the states of the embedded application by storing instances of container images capable of being deployed by the application manager 400, instances of container images having been deployed, identifiers of IOT edge nodes having been commissioned to receive container images from the application manager 400, parameters supported by the container images, values of the parameters supported by the container images, or the like. The embedded application state unit 414 can update the model of the embedded applications on the IOT edge nodes when a new container image has been deployed to or released from an IOT edge node, based on contents of the application messages 402 from the IOT edge nodes implementing the embedded applications, or the like. In some embodiments, the model of the embedded application can correspond to an avatar of the deployed container images on the IOT edge nodes, which can mimic the operational states of the deployed container images as implemented on the IOT edge nodes. For example, when an IOT edge node implements a sound classification embedded application, the embedded application state unit 414 can generate a model of the sound classification embedded application that identifies the IOT edge node, identifies the sound classification embedded application has been deployed on the IOT edge node, identifies the parameters associated with the sound classification embedded application, identifies the values of the parameters, or the like.

The application manager 400 can include a publish-subscribe unit 420 to generate parameter messaging 403, which can prompt the IOT edge nodes to import or export parameters associated with embedded applications implemented by the IOT edge nodes. Since the embedded application state unit 414 can include a model of the embedded application deployed in the IOT edge node, the publish-subscribe unit 420 can generate parameter messaging 403 to import or export parameters associated with the embedded application. In some embodiments, the publish-subscribe unit 420 can include parameter values in the parameter messaging 403 and the IOT edge nodes can import the parameter values into the embedded applications. The ability to import of parameter values into the embedded applications can allow the IOT server to remotely modify a deployed container image without having to release the already deployed container image and deploy a new container 401 with a modified container image.

The publish-subscribe unit 420 can generate parameter messaging 403 that, when provided to the IOT edge node, can prompt the IOT edge node to export a parameter value as application parameters 404. The IOT edge node can transmit the application parameters 404 to the application manager 400 in the IOT server, which can utilize the parameter values to update the model of the embedded application. In some embodiments, the publish-subscribe unit 420 can retransmit the application parameters 404 to a different networking device or server platform, for example, to a networking device subscribed to receive the parameter value(s) exported from the IOT edge node in the application parameters 404. In some embodiments, the parameter messaging 403 can specify where the IOT edge node should export the application parameters 404, for example, identify a networking device to receive the application parameters 404. The publish-subscribe unit 420 may utilize the models of the embedded applications to identify and track which parameter values to export from which embedded applications and which networking devices, such as other IOT edge nodes subscribe to receive the parameter values. The publish-subscribe unit 420 can generate the parameter messaging 403 to prompt an import of parameters from the embedded applications implemented on the IOT edge nodes, to prompt an export of parameters from the embedded applications implemented on the IOT edge nodes, to prompt the embedded applications implemented on the IOT edge nodes share parameters between themselves, or the like.

The application manager 400 can include a distributed resource utilization unit 430 to utilize multiple distributed IOT edge nodes to implement complex services, for example, by coordinating the deployment of containers 401 to the IOT edge nodes, while utilize the models of the deployed embedded applications along with the publish-subscribe technology to have the embedded applications communicate with each other across the distributed IOT edge nodes. By modeling the states of the embedded applications and coordinating the sharing of parameter values across distributed IOT edge nodes, the application manager 400 can direct the distributed IOT edge nodes to implement complex computing tasks or provide complex services, for example, unable to be performed by an individual IOT edge node.

In some embodiments, the distributed resource utilization unit 430 can off-load processing from the server environment to one or more of the IOT edge nodes in the on-premises environment. In some embodiments, the application manager 400 in the IOT server can identify available processing and/or memory resources in the IOT edge nodes, deploy containers 401 having container images that, when executed by the IOT edge nodes having available processing and/or memory resources, can perform the off-loaded processing from the server environment. The distributed resource utilization unit 430 can work in conjunction with the embedded application state unit 414 and the publish-subscribe unit 420 to enable multiple IOT edge nodes implementing the off-loaded processing to communicate parameters with each other. When multiple IOT edge nodes implement the off-loaded processing, the distributed resource utilization unit 430 can utilize the embedded application state unit 414 to generate models for the embedded applications to implement the off-loaded processing, and utilize the publish-subscribe unit 420 to configure parameter messaging 403 prompting exchange of parameters between the IOT edge nodes in order to accomplish their processing tasks.

Figure 5:
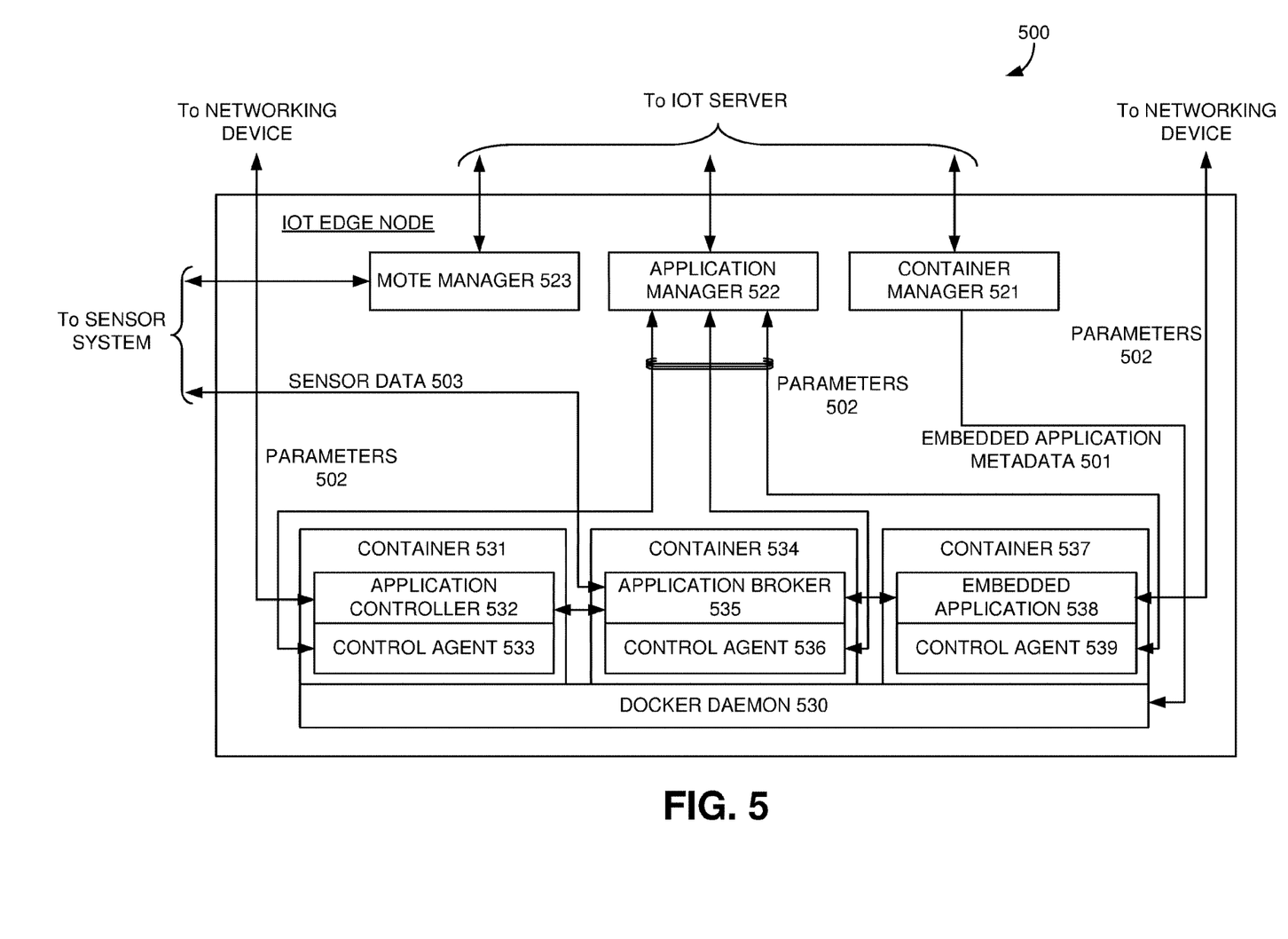
FIG. 5 illustrates an example of an IOT edge node according to various embodiments.

FIG. 5 illustrates an example of an IOT edge node 500 with multiple deployed embedded applications according to various embodiments. Referring to FIG. 5, the IOT edge node 500 can include a container manager 521 to receive containers 501 from an IOT server, for example, located in a server environment. The containers 501 can include container images corresponding to embedded applications for deployment on the IOT edge node 500. The container manager 521 can provide the containers to Docker daemon 530 in the IOT edge node 500, which can implement a Docker engine and execute the container images in the containers 501 to realize the embedded applications.

In the instant example, the Docker daemon 530 can have a Docker engine capable of supporting embedded applications corresponding to multiple containers 531, 534, and 537. The container 531, when implemented by the Docker daemon 530, can execute a container image and implement an application controller 532. The container 531 also can include a control agent 533 to communicate parameters 502 associated with the application controller 532 to the IOT server via an application manager 522. In some embodiments, the control agent 533 can include a messaging application to communicate with the application manager 522 to import and export parameter values associated with the container 531 and the application controller 532. The container 534, when implemented by the Docker daemon 530, can execute a container image and implement an application broker 535. The container 534 also can include a control agent 536 to communicate parameters 502 associated with the application broker 535 to the IOT server via the application manager 522. In some embodiments, the control agent 536 can include a messaging application to communicate with the application manager 522 to import and export parameter values associated with the container 534 and the application broker 535. The container 537, when implemented by the Docker daemon 530, can execute a container image and implement an embedded application 538. The container 537 also can include a control agent 539 to communicate parameters 502 associated with the embedded application 538 to the IOT server via the application manager 522. In some embodiments, the control agent 539 can include a messaging application to communicate with the application manager 522 to import and export parameter values associated with the container 537 and the embedded application 538.

The application manager 522 can receive parameter messages from the IOT server, for example, requesting to import or export parameters 502 from the containers 531, 534, or 537. The application manager 522 can identify which of the containers 531, 534, or 537 to send the parameter messages and transmit the parameter messages to the control agents 533, 536, or 539 corresponding to the identified containers 531, 534, or 537. In some embodiments, the control agents 533, 536, or 539, in response to the parameter messages, can import a parameter value from the parameter messages. The control agents 533, 536, or 539 also can direct an export of a parameter 502 in response to the parameter messages. In some embodiments, the control agents 533, 536, or 539 can export parameters 502 to the application manager 522 for transmission to the IOT server in response to the parameter messages, for example, implementing a "commit" logic typically utilized for process control. The control agents 533, 536, or 539 also can prompt the corresponding embedded applications, such as application controller 532 or embedded application 538, to export parameters 502 to a networking device, such as the IOT server, a different IOT edge node, a server environment, or the like.

The IOT edge node 500 can include a mote manager 523 to communicate with a sensor system, for example, having one or more sensors, actuators, peripheral nodes performing various operations, such as Artificial Intelligence (AI), or the like, located in an industrial environment. The mote manager 523 can receive messaging from an IOT server, for example, located in a server environment. In some embodiments, the messaging can include configuration data for the sensor system, and the mote manager 523 can forward the messaging to the sensor system or prompt the configuration of the sensor system based on the configuration data. The mote manager 523 also can receive information from the sensor system and forward the information to the IOT server, for example, generate messaging that includes the information and transmit the messaging to the IOT server.

The IOT edge node 500 executing the container images in the containers 531, 534, and 537 can implement a complex system, such as an industrial monitoring system utilizing sensor data 503 from the sensor system. The application broker 535 can receive the sensor data 503 from the sensor system and distribute the sensor data 503 to the application controller 532 and the embedded application 538. In some embodiments, the application controller 532 and the embedded application 538 can be provided the messaging parameters of the application broker 535 via publish-subscribe operation. For example, the IOT server can request parameters 502 associated with the messaging functionality of the application broker 535, which can be provided by the control agent 536 to the IOT server. The IOT server can utilize the publish-subscribe functionality to import the messaging parameters of the application broker 535 to the application controller 532 and the embedded application 538, which can allow the application broker 535 to distribute the sensor data 503 to the application controller 532 and the embedded application 538.

The application controller 532 and the embedded application 538 can analyze the sensor data 503 to monitor an industrial environment. When the application controller 532 and/or the embedded application 538 detect an event based on the analysis of the sensor data 503, such as a machine malfunction, a temperature change, a detected noise, or the like, the application controller 532 and/or the embedded application 538 can generate application messaging for transmission to the IOT server or other networking device. The application messaging can include an indication of the detected event, sensor data 503 corresponding to the detected event, or the like.

Centralized Management of Data Flow Maps for Distributed Edge Node Deployment

Figure 6A:
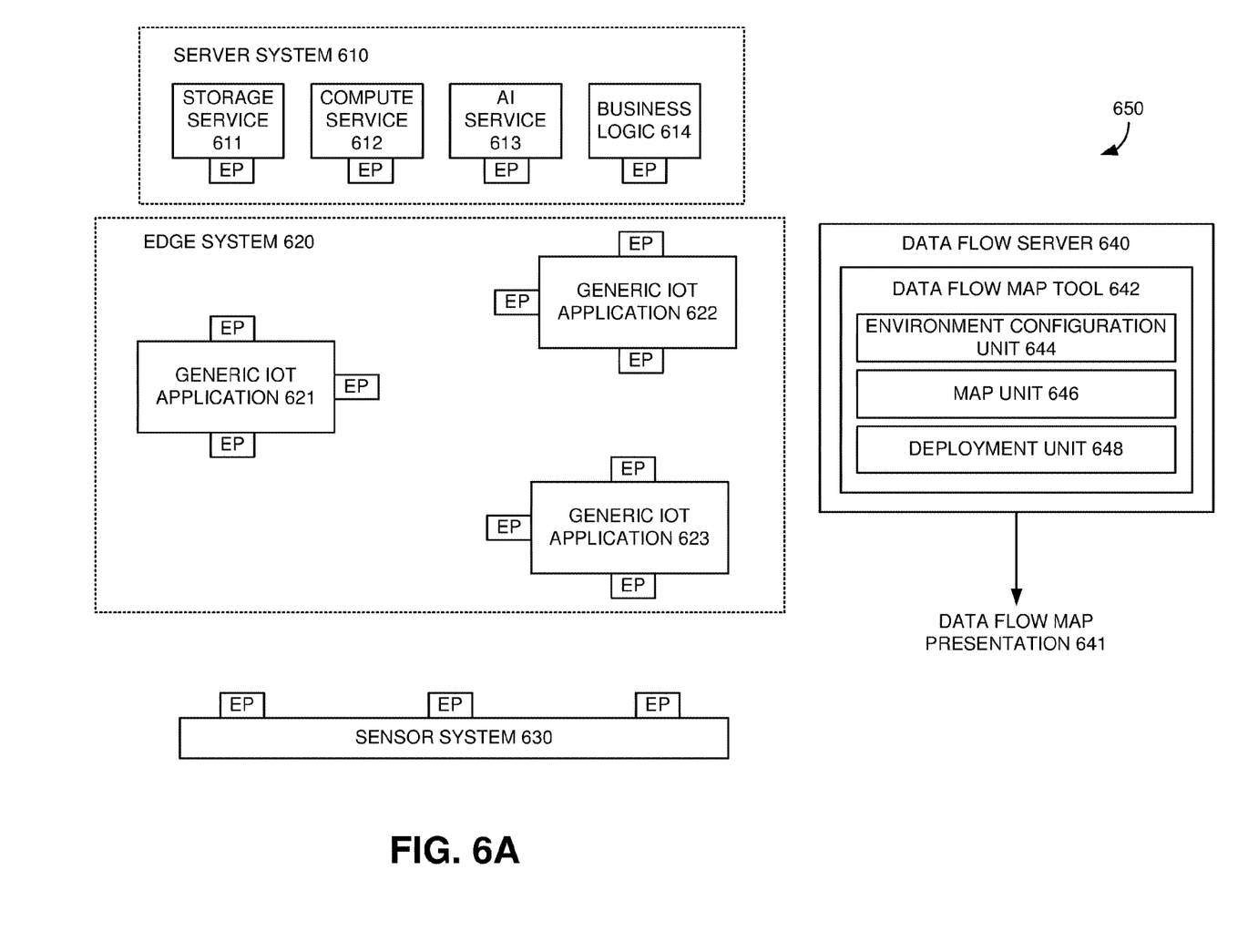
FIGS. 6A and 6B illustrate an example IOT system including a data flow server having a data flow map tool according to various embodiments.
Figure 6B:
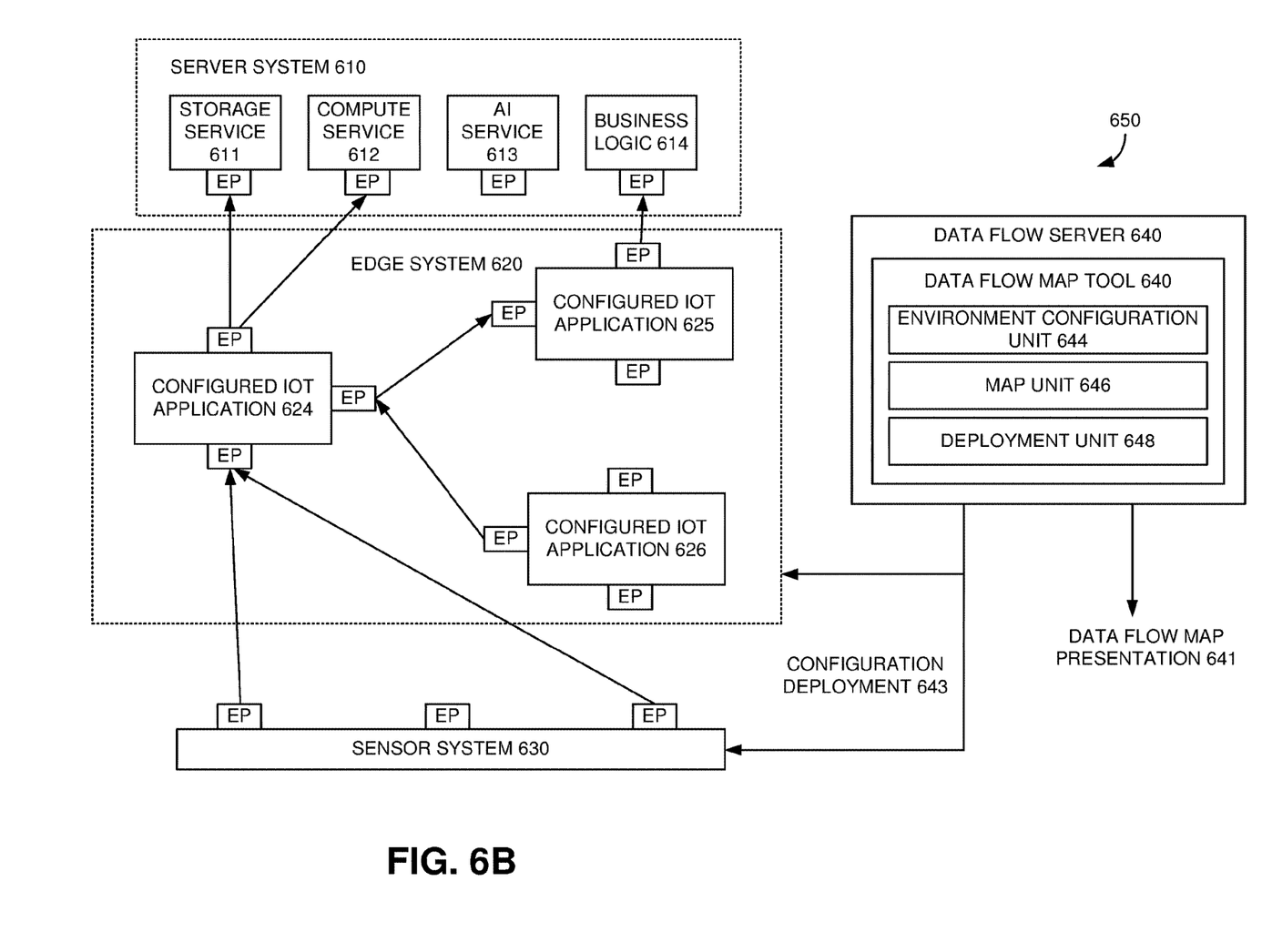

FIGS. 6A and 6B illustrate an example IOT system 600 including a data flow server 640 having a data flow map tool 642 according to various embodiments. Referring to FIG. 6A, the IOT system 600 can include a server system 610 having one or more IOT servers configured to implement services, such as a storage service 611, a compute service 612, an artificial intelligence (AI) service 613, a business logic service 614, or the like, for managed devices in the IOT system 600.

The managed devices in the IOT system 600 can include generic IOT applications 621-623 in an edge system 620 and sensors, actuators, or other peripherals in a sensor system 630. In some embodiments, the edge system 620 can include one or more IOT edge nodes configured, for example, with a containerized application, to implement the generic IOT applications 621-623. The sensor system 630 can gather or generate information, for example, by monitoring one or more devices, and transmit the information to the server system 610 through the edge system 620. In a manufacturing environment, such as a factory floor or multiple distributed factories, the sensor system 630 can gather information corresponding to the manufacturing of a product, for example, by identifying operations or operational states of manufacturing equipment, manufacturing lines, the manufacturing of products, inventory, testing or verification procedures for the products, or the like.

The edge system 620 can facilitate data communication between the server system 610 and the sensor system 630 and, in some embodiments, perform data processing or filtering operations on the data received by the sensor system 630 or the server system 610. The edge system 620 can include multiple generic IOT applications 621-623 capable of exchanging data with the server system 610, the sensor system 630, and each other. In some embodiments, the generic IOT applications 621-623 can include embedded application systems configured, for example, with a containerized application, to implement programmable edge devices capable of being configured to implement data flows between the services 611-614 in the server system 610 and the sensors in the sensor system 630.

The IOT system 600 can include data flow server 640 to define data flows between the sensor system 630 and the server system 610 through the applications deployed on the edge system 620. The data flow map tool 642 in the data flow server 640 can generate one or more data flow maps that define paths from data to traverse the IOT system 600 along with any data processing or filtering for the edge system 620 to perform on the data.

The data flow map tool 642 can include an environment configuration unit 644 to model the server system 610 by separately modeling the IOT servers in the server system 610 or the services, such as a storage service 611, a compute service 612, an artificial intelligence (AI) service 613, a business logic service 614, or the like, implemented in the server system 610. In some embodiments, the environment configuration unit 644 can identify endpoints for the IOT servers in the server system 610 or the services in the server system 610. The endpoints can correspond to portions of the IOT servers in the server system 610 or the services capable of exchanging data with the edge system 620.

The environment configuration unit 644 can model the edge system 620 by separately modeling the generic IOT applications 621-623 by their endpoints and the data processing operations capable of being implemented in the generic IOT applications 621-623. The endpoints can correspond to portions of the generic IOT applications 621-623 in the edge system 620 capable of exchanging data with server system 610, the sensor system 630, or other generic IOT applications in the edge system 620.

The environment configuration unit 644 can model the sensor system 630 by separately modeling the sensors implemented in the sensor system 630 according to a device the sensor monitors, a type of information gathered, or the like. In some embodiments, the environment configuration unit 644 can identify endpoints for the sensors in the in the sensor system 630. The endpoints can correspond to portions of the sensors in the sensor system 630 capable of exchanging data with the edge system 620.

The data flow map tool 642 can include a map unit 646 to generate one or more data flow maps based on the models of the server system 610, the edge system 620, the generic IOT applications 621-623, and the sensor system 630. Each of the data flow maps can describe a configuration for the IOT system 600 and define the data flow through the IOT system 600. The data flow maps can utilize the endpoints in the IOT system 600 to link the sensors in the sensor system 630 to one or more of the generic IOT applications 621-623 in the edge system 620, and link the generic IOT applications 621-623 in the edge system 620 to each other or to one or more IOT servers or services in the server system 610. The data flow maps can identify a direction for the flow of data, for example, from a sensor-to-edge node-to-server, along with any active data processing, transformation, manipulation, filtering operations, or the like, to be performed on the data by one or more of generic IOT applications 621-623 in the data flow.

In some embodiments, the map unit 646 can generate a data flow map presentation 641 that can display the models of the sensors, IOT servers or services, and generic IOT applications 621-623 in the IOT system 600. The data flow server 640, in response to user input, can link the models in the IOT system 600, for example, endpoint-to-endpoint, and define data processing operations to generate the data flow maps.

The data flow map tool 642 can include a deployment unit 648 to prompt the IOT system 600 to implement a configuration corresponding to at least one of the data flow maps. As will be described below in greater detail with reference to FIG. 6B, the deployment unit 648 can configure the generic IOT applications 621-623, the sensor system 630, and the server system services 611-614 to form an interconnect for the exchange of data between the server system 610 and the sensor system 630 and, optionally, to process data received in a data flow.

Referring to FIG. 6B, the IOT system 650 is similar to the IOT system 600 described in FIG. 6A except the data flow server 640 has deployed an example data flow map into the IOT system 650. The deployment unit 648 can generate a configuration deployment 643 based on the example data flow map and provide the configuration deployment 643 to the edge system 620, the configured IOT applications 624-626, the sensor system 630, and the server system services 611-614. The generic IOT applications 621-623 in FIG. 6A can receive the configuration deployment 643 from the data flow map tool 640, which can configure the generic IOT applications 621-623 according to the example data flow map into the configured IOT applications 624-626. The sensors in the sensor system 630 also can receive the configuration deployment 643 from the data flow server 640, which can configure the sensors according to the example data flow map. The configuration of the edge system 620 and the sensor system 630 with the configuration deployment 643 can allow the sensor system 630 to communicate with the server system 610 via the edge system 620 and, optionally, for the edge system 620 to perform data processing operations on the data exchanged between the sensor system 630 and the server system 610.

The data flow server 640 can re-configure the IOT system 650 by transmitting a new configuration deployment 643 corresponding to a different data flow map developed by the map unit 646. In some embodiments, the data flow server 640 can store many different data flow maps, which each describe a different configuration of the modeled IOT system 6600 in FIG. 6A. This deployment and re-deployment of data flow maps onto the IOT system 650 may prompt a fast re-configuration of the IOT system 650 relative to a conventional process of stopping application and re-deploying a new set of applications. By including programmable edge devices, such as the generic IOT applications 621-623 described in FIG. 6A, the data flow server 640 can configure and re-configure the IOT system 650 to implement multiple different data flows without having to hardcode the data flows into the sensor system 630 and the edge system 620.

Figure 7:
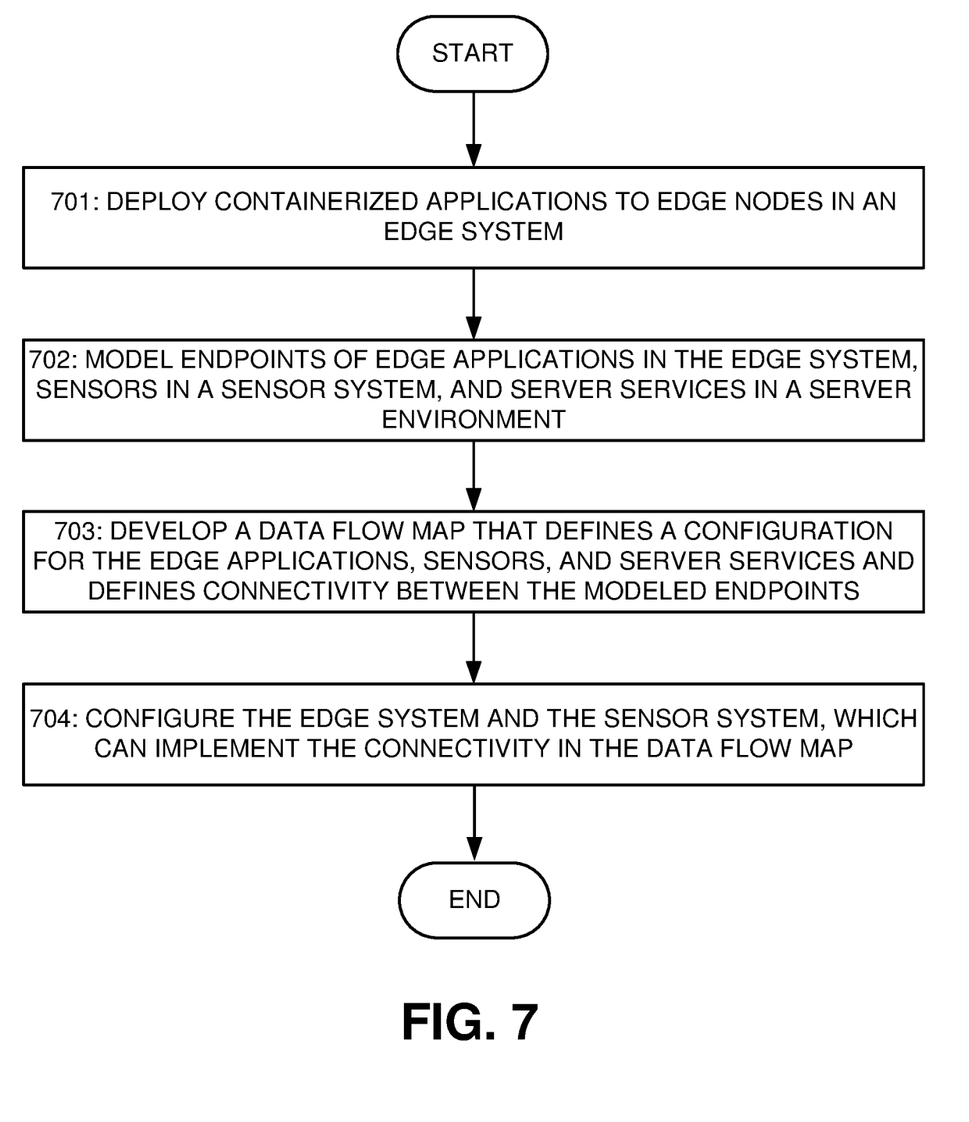
FIG. 7 illustrates an example flowchart for implementation of a data flow map to configure an IOT system according to various embodiments.

FIG. 7 illustrates an example flowchart for implementation of a data flow map to configure an IOT system according to various embodiments. Referring to FIG. 7, in a block 701, a computing system implementing a data flow map tool can deploy containerized applications to edge nodes in an edge system. In some embodiments, the edge nodes can include embedded application systems to implement Docker engines for executing container images, for example, standalone, executable embedded applications, which can include executable ode, runtime, system tools, system libraries, settings, or the like, utilized by the Docker engines to implement the embedded applications corresponding to the container images. When an edge node receives a container image corresponding to a programmable edge application, the edge node can execute the container image to implement a configurable IOT application capable of further configuration, for example, by a data flow server.

In a block 702, the computing system implementing the data flow map tool can model endpoints of configurable IOT applications in an edge system, sensors, actuators, or other peripherals in a sensor system, and servers in a server environment. In some embodiments, the data flow map tool can model the server system by identifying endpoints for IOT servers or the services in the server system and then separately modeling IOT servers or services, such as a storage service, a compute service, an artificial intelligence (AI) service, a business logic service, or the like, based on their endpoints. The endpoints can correspond to portions of the IOT servers in the server system or the services capable of exchanging data with the edge system.

The data flow map tool can model the edge system by identifying endpoints of the configurable IOT applications hosted by one or more edge nodes in the edge system, identifying data processing capabilities in the configurable IOT applications, and separately modeling the configurable IOT applications by their endpoints and the data processing capabilities. The endpoints can correspond to portions of the configurable IOT applications capable of exchanging data with server system, the sensor system, or other configurable IOT applications hosted by one or more edge nodes in the edge system.

The data flow map tool can model the sensor system by separately modeling the sensors implemented in the sensor system according to a device the sensor monitors, a type of information gathered, or the like. In some embodiments, the environment configuration unit can identify endpoints for the sensors in the in the sensor system. The endpoints can correspond to portions of the sensors in the sensor system capable of exchanging data with the edge system.

In a block 703, the computing system implementing the data flow map tool can develop a data flow map that defines a configuration for the configurable IOT applications and defines connectivity between the modeled endpoints. The data flow map tool can develop the data flows between the server system and the sensor system via the edge system, which can include endpoint-to-endpoint links between the configurable IOT applications and sensors, other configurable IOT applications, and/or servers along with a description of the data processing operations to be performed by the configurable IOT applications. The data flows defined by the data flow map tool can be implemented into a data flow map, which can describe a configuration for the sensors, configurable IOT applications, and servers, which can implement the data flows developed by the data flow map tool.

In a block 704, the computing system implementing the data flow map tool can configure the edge system and the sensor system, which can implement the connectivity in the data flow map. In some embodiments, the data flow map tool can transmit a deployment configuration to the sensor system, which can prompt the sensors to output gathered data at a particular endpoint for transmission to a particular configurable IOT application. The data flow map tool also can transmit a deployment configuration to the edge system, which can prompt the configurable IOT applications to exchange data via particular endpoints with sensors, server, and/or configurable IOT applications. In some embodiments, the deployment configuration also can program the configurable IOT applications to implement one or more data processing algorithms, for example, to filter or manipulate data exchanged between the server system and the sensor system. Once configured with the deployment configuration, the sensor system, the edge system, and the server system can implement the data flows defined in the data flow map.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments, those skilled in the art will appreciate that there are numerous variations and permutations of the above described systems and techniques that fall within the spirit and scope of the invention as set forth in the appended claims.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
generating, by a computing system, models of managed devices in an Internet of Things (IOT) system, wherein the managed devices include one or more edge devices hosting programmable edge device applications and sensors configured to output data towards one or more servers in the IOT system, and wherein generating the models of the managed devices in the IOT system includes identifying each endpoint in the programmable edge device applications capable of transmitting or receiving the data and defining flows for the data from the endpoints of the sensors to the endpoints of the IOT servers via the endpoints of the programmable edge device applications;
developing, by the computing system, a data flow map to define a connectivity of the programmable edge device applications to the sensors and the servers in the IOT system for exchanging the data from the sensors to the servers in the IOT system via the programmable edge device applications; and
prompting, by the computing system, configuration of the programmable edge device applications in the IOT system based on the data flow map, which implements the connectivity of the programmable edge device applications to the sensors and to servers in the IOT system.

2. The method of claim 1, wherein the data flow map is configured to define data processing applications for the programmable edge device applications to implement, and wherein prompting the configuration of the programmable edge device applications in the IOT system based on the data flow map includes deploying the data processing applications onto the programmable edge device applications based on the data flow map.

3. The method of claim 1, wherein the sensors are configured to monitor manufacturing equipment to obtain the data, which the sensors output towards the servers in the IOT system.

4. The method of claim 1, wherein the programmable edge device applications correspond to remote edge node devices having been configured with an embedded application allowing for configuration of the device applications according to the data flow map.

5. The method of claim 4, wherein at least one of the servers is configured to deploy the embedded applications to the remote edge node devices, and wherein the embedded application, when executed by the remote edge node devices, prompts the remote edge node devices to implement the programmable edge device applications.

6. The method of claim 4, wherein the remote edge node devices include one or more processing devices configured to implement Docker engines to execute the embedded applications.

7. An apparatus comprising at least one memory device storing instructions configured to cause one or more processing devices to perform operations comprising:
generating models of managed devices in an Internet of Things (IOT) system, wherein the managed devices include one or more edge devices hosting programmable edge device applications and sensors configured to output data towards one or more servers in the IOT system, and wherein generating the models of the managed devices in the IOT system includes identifying each endpoint in the programmable edge device applications capable of transmitting or receiving the data and defining flows for the data from the endpoints of the sensors to the endpoints of the IOT servers via the endpoints of the programmable edge device applications;
developing a data flow map to define a connectivity of the programmable edge device applications to the sensors and the servers in the IOT system for exchanging the data from the sensors to the servers in the IOT system via the programmable edge device applications; and
prompting configuration of the programmable edge device applications in the IOT system based on the data flow map, which implements the connectivity of the programmable edge device applications to the sensors and to servers in the IOT system.

8. The apparatus of claim 7, wherein the data flow map is configured to define data processing applications for the programmable edge device applications to implement, and wherein the instructions are further configured to cause the one or more processing devices to perform operations comprising deploying the data processing applications onto the programmable edge device applications based on the data flow map.

9. The apparatus of claim 7, wherein the sensors are configured to monitor manufacturing equipment to obtain the data, which the sensors output towards the servers in the IOT system.

10. The apparatus of claim 7, wherein the programmable edge device applications correspond to remote edge node devices having been configured with an embedded application allowing for configuration of the device applications according to the data flow map.

11. The apparatus of claim 10, wherein at least one of the servers is configured to deploy the embedded applications to the remote edge node devices, and wherein the embedded application, when executed by the remote edge node devices, prompts the remote edge node devices to implement the programmable edge device applications.

12. The apparatus of claim 10, wherein the remote edge node devices include one or more processing devices configured to implement Docker engines to execute the embedded applications.

13. A system comprising:
a memory device configured to store machine-readable instructions; and
a computing system including one or more processing devices, in response to executing the machine-readable instructions, configured to:
generate models of managed devices in an Internet of Things (IOT) system, wherein the managed devices include one or more edge devices hosting programmable edge device applications and sensors configured to output data towards one or more servers in the IOT system, and wherein the models of the managed devices in the IOT system are generated by identifying each endpoint in the programmable edge device applications capable of transmitting or receiving the data and defining flows for the data from the endpoints of the sensors to the endpoints of the IOT servers via the endpoints of the programmable edge device applications;
develop a data flow map to define a connectivity of the programmable edge device applications to the sensors and the servers in the IOT system for exchanging the data from the sensors to the servers in the IOT system via the programmable edge device applications; and
prompt configuration of the programmable edge device applications in the IOT system based on the data flow map, which implements the connectivity of the programmable edge device applications to the sensors and to servers in the IOT system.

14. The system of claim 13, wherein the data flow map is configured to define data processing applications for the programmable edge device applications to implement, and wherein the one or more processing devices, in response to executing the machine-readable instructions, are configured to deploy the data processing applications onto the programmable edge device applications based on the data flow map.

15. The system of claim 13, wherein the sensors are configured to monitor manufacturing equipment to obtain the data, which the sensors output towards the servers in the IOT system.

16. The system of claim 13, wherein the programmable edge device applications correspond to remote edge node devices having been configured with an embedded application allowing for configuration of the device applications according to the data flow map.

17. The system of claim 16, wherein at least one of the servers is configured to deploy the embedded applications to the remote edge node devices, and wherein the embedded application, when executed by the remote edge node devices, prompts the remote edge node devices to implement the programmable edge device applications.

* * * * *